Nov. 23, 1943. S. A. MAYES 2,334,881
UPHOLSTERED DOOR COVER
Filed May 23, 1941 2 Sheets-Sheet 1
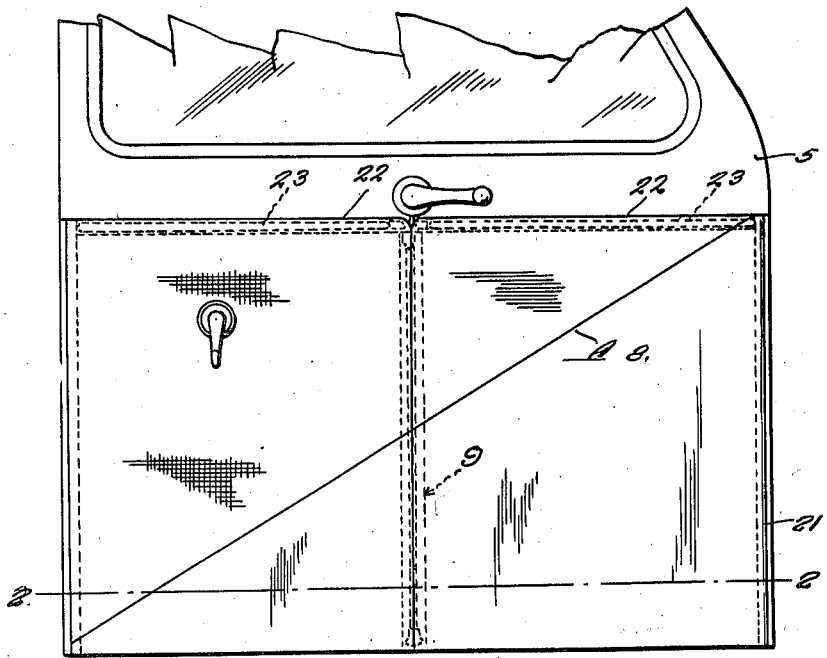
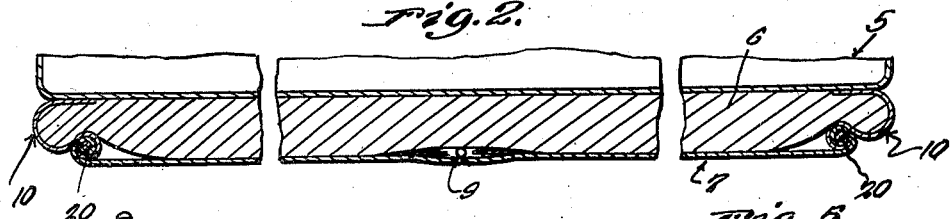
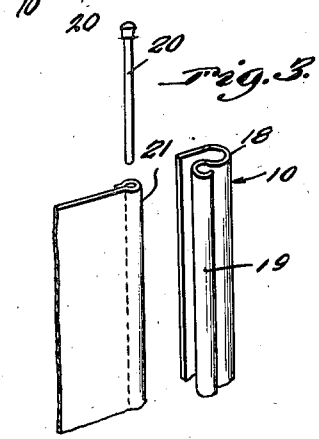
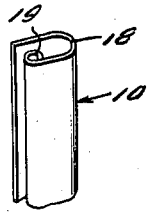
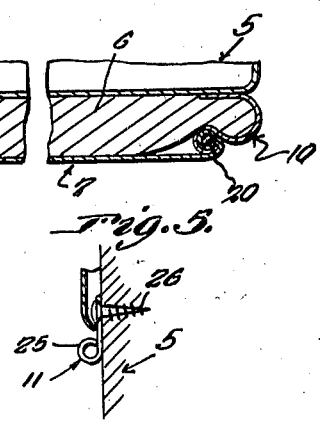
Samuel A. Mayes
By Clarence A. O'Brien
Attorney

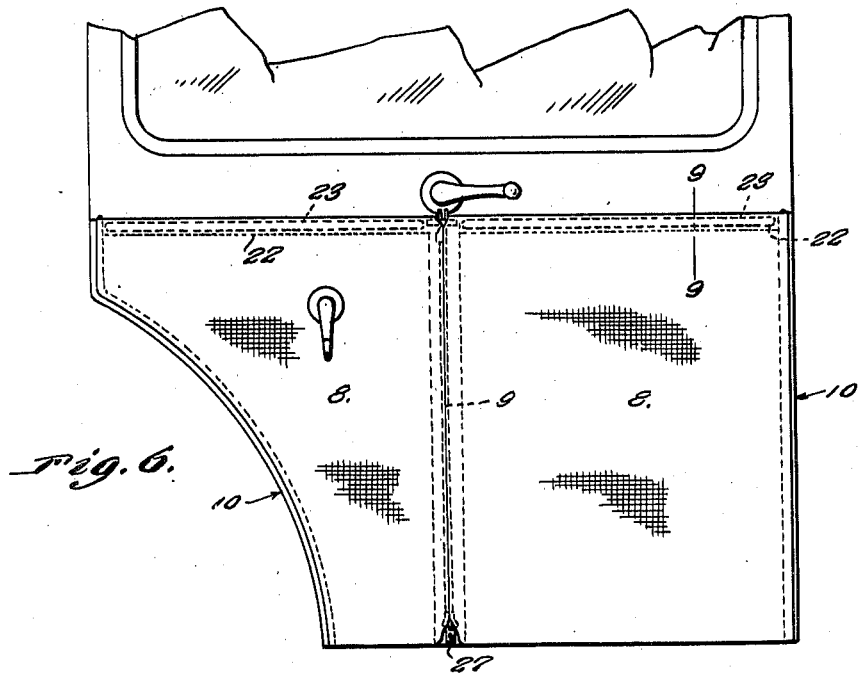
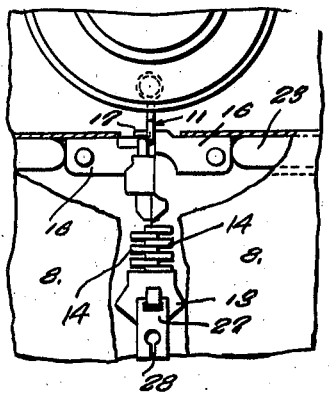
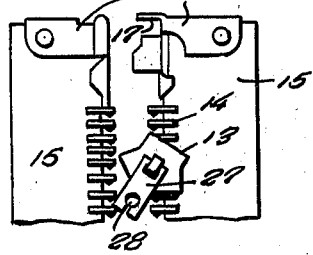
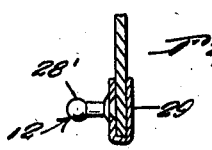
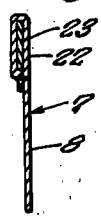

Patented Nov. 23, 1943

2,334,881

UNITED STATES PATENT OFFICE 2,334,881

UPHOLSTERED DOOR COVER

Samuel A. Mayes, Detroit, Mich.

Application May 23, 1941, Serial No. 394,925

3 Claims. (Cl. 45—138)

This invention relates to upholstered door covers for motor vehicles, and has for the primary object the provision of a device of this character which may be readily installed by unskilled persons to cover a desired upholstered portion of a door which is subject to wear, soiling or other damage without the use of tacks, screws or similar fasteners and which will have, when applied, a neat or tailored appearance and may be easily removed when desired or for cleaning or laundering purposes.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation illustrating a portion of an upholstered door equipped with a covering constructed in accordance with my invention.

Figure 2 is a sectional view taken on the line 2—2 of Figure 1.

Figure 3 is a fragmentary exploded perspective view illustrating one of the attaching strips and the means of removably securing thereto the covering.

Figure 4 is a fragmentary perspective view illustrating a modified form of the attaching strip.

Figure 5 is a detail sectional view illustrating an anchor fastened in place on the door.

Figure 6 is a view similar to Figure 1 showing a slight modification of the present invention as adapted to a rear door of a motor vehicle.

Figure 7 is a fragmentary side elevation, partly in section, illustrating a slide fastener for securing the sections of the cover together and operating in conjunction with the anchor.

Figure 8 is a fragmentary plan view showing the slide fastener in an open position.

Figure 9 is a detail sectional view taken on the line 9—9 of Figure 6 showing a stave within the upper edge of the cover.

Figure 10 is a fragmentary sectional view showing another anchor for coaction with the slide fastener.

Referring in detail to the drawings, the numeral 5 indicates a fragmentary portion of a motor vehicle door and 6 the upholstery of said door. The portion of the upholstery below the window of the door is subjected to soiling, severe wear and the like during the use of the motor vehicle and to protect this portion of the upholstery and maintain it in a clean or otherwise sanitary condition a cover 7 is adapted thereto in accordance with the present invention. It is proposed that the covering withstand or take the wear subjected to the upholstery and to be easily applicable and removable from the door, primarily for the purpose of permitting the cover to be cleaned, laundered or otherwise reconditioned.

The cover 7 includes separable panel sections 8, a slide fastener 9, attaching strips 10 and anchors 11 and 12.

The slide fastener 9 is of a conventional construction, commercially known as a "zipper" in which the sliding key 13 coacts with key-engaging elements 14 mounted on attaching tapes 15 in primarily making up the slide fastener. The slide fastener further includes portions 16 to permit the slide key 13 to be completely separated from one group of the key-engaging elements 14 when desiring to bring about a complete separation of the tapes 15 of the slide fastener. One of the parts or portions 16 includes an extension or tongue 17 to engage with the anchor 11 of the present invention.

It is the present-day practice of securing the upholstery 6 on the door so that the upholstery will have at the edges thereof tufted portions or beadings to present finished and attractive appearance to the door. In adapting the present to the door it is proposed to use the beading or tufted portions in securing of the cover onto the upholstery.

Engaged with the vertical tufted portions or beadings of the upholstery are the attaching strips 10 as clearly shown in Figure 2, each consisting of a channel portion 18 of substantially U-shape in cross section to receive therein the tufted edge or beading of the upholstery with a firm grip thereon. The attaching strip 10 is further provided with a channel portion 19 which may be disposed exteriorly of the channel portion 18, as shown in Figure 3, or internally of the channel portion, as shown in Figure 4. The channel portion 19 is for the purpose of removably receiving an anchoring rod 20 and a hemmed edge 21 of the cover. It is to be understood that the hemmed edges 21 of the cover are arranged in the channels 19 of the attaching strips with the anchoring rods 20 inserted in the hems which prevents the hems from moving outwardly of the channels 19 but which will permit detaching of the cover from the attaching strips when desiring to clean, launder or otherwise recondition the cover. It is proposed that the rods 20 each have a headed end to prevent the rods from moving all the way through the hems.

It is to be understood that the outer vertical edges of the panel sections 8 are secured onto the upholstery 6 by the attaching strips 10 and the adjacent or vertical inner edges of the panel sections are detachably connected by the slide fastener 9, the tapes 15 thereof being secured onto the panel sections in any well known manner.

Thus it will be seen that when the outer edges of the panel sections are secured onto the vertical edges of the upholstery by the attaching strips 10 and the panels joined together by the slide fastener 9 the cover will be efficiently applied to the upholstery with a neat or tailored appearance.

The upper edges of the panel sections may be provided with hems 22 in which are removably mounted staves 23 to prevent sagging of the upper edges of the panels when applied to the upholstery. It is to be understood that these staves may be constructed of any material suitable for the purpose and are removable from the panel sections when it is desired to launder the latter.

Any selected kind of material may be employed in the construction of the panel sections of the cover and as indicated in Figure 1 by the diagonal line A, certain parts of the panel sections may be made of one material and the other parts of another material. Further, by referring to Figure 6 it will be seen that in order to adapt the cover to certain types of motor vehicle doors one of the panel sections must be cut on a curve to conform to the contour of the upholstery of the door and that one of the attaching strips also must have a curvature thereto. The panel sections may have openings therein to permit the hardware of the door to pass through the cover on the application of the latter to the upholstery of the door.

The anchor 11 includes an eye 25 to engage with the tongue or extension 17 of the slide fastener and is secured onto the door by a screw or like fastener 26 with the latter concealed under a portion of the hardware of the door. The anchor 11 engaging the slide fastener aids in preventing the cover from sagging at the upper edge.

The key 13 of the cover has the usual finger piece 27 and is provided with a slot 28 through which the anchor 12 may extend when the slide fastener 9 is in a position of detachably connecting the panel sections of the cover together. The anchor 12 includes a post 28' which enters the slot 28 of the finger piece 27 and also a substantially U-shaped clip 28 to engage with the lower edge of the door or the lower edge of the upholstery. The slide fastener thus connected to the anchors as specified will coact with the attaching strips in such a way as to keep the panel sections of the cover lying flatly against the upholstery 6.

It is believed that the foregoing description, when taken in connection with the drawings, will fully set forth the construction and advantages of this invention to those skilled in the art to which such a device relates, so that further detailed description will not be required.

Having thus described the invention, what I claim is:

1. In combination with the upholstery of an automobile door, attaching strips each including double channel portions with one channel portion thereof receiving and gripping an edge of upholstery of the door, a cover for the upholstery, and means for detachably securing edges of the cover in the other channel portions of the attaching strips, including hems in the cover receivable in the latter-named channel portions and anchoring rods insertible in the hems, said cover panel including sections, and a slide fastener detachably connecting the sections.

2. In combination with the upholstery of an automobile door, attaching strips each including double channel portions with one channel portion thereof receiving and gripping an edge of upholstery of the door, a cover for the upholstery, and means for detachably securing edges of the cover in the other channel portions of the attaching strips, including hems in the cover receivable in the latter-named channel portions, anchoring rods insertible in the hems, said cover panel including sections, and a slide fastener detachably connecting the sections, and anchors engageable with the slide fastener and mounted on the door.

3. In combination with the upholstery of an automobile door, attaching strips each including double channel portions with one channel portion thereof receiving and gripping an edge of upholstery of the door, a cover for the upholstery, and means for detachably securing edges of the cover in the other channel portions of the attaching strips, including hems in the cover receivable in the latter-named channel portions and anchoring rods insertible in the hems, said cover panel including sections, and a slide fastener detachably connecting the sections, and anchors engageable with the slide fastener and mounted on the door, said cover sections including hems extending along the top edges of the cover sections and reinforcing staves removably mounted in the last-named hems.

SAMUEL A. MAYES.